United States Patent
Ernstad et al.

(10) Patent No.: US 9,702,092 B2
(45) Date of Patent: Jul. 11, 2017

(54) WIND, SNOW AND SAND PROTECTING DEVICE FOR RAILWAYS

(71) Applicant: Osborn International AB, Huskvarna (SE)

(72) Inventors: Björn Ernstad, Vetlanda (SE); Per Axelsson, Aspered (SE)

(73) Assignee: OSBORN INTERNATIONAL AB, Huskvarna (SE)

( * ) Notice: Subject to any disclaimer, the term of this patent is extended or adjusted under 35 U.S.C. 154(b) by 98 days.

(21) Appl. No.: 14/782,451

(22) PCT Filed: Dec. 12, 2013

(86) PCT No.: PCT/EP2013/076455
§ 371 (c)(1),
(2) Date: Oct. 5, 2015

(87) PCT Pub. No.: WO2014/166559
PCT Pub. Date: Oct. 16, 2014

(65) Prior Publication Data
US 2016/0053440 A1    Feb. 25, 2016

(30) Foreign Application Priority Data
Apr. 11, 2013 (EP) ..................... 13163253

(51) Int. Cl.
*E01B 19/00* (2006.01)
*E01B 26/00* (2006.01)

(52) U.S. Cl.
CPC ............ *E01B 19/00* (2013.01); *E01B 26/005* (2013.01)

(58) Field of Classification Search
CPC ....... E01B 19/00; E01B 19/006; E01B 26/005
See application file for complete search history.

(56) References Cited

U.S. PATENT DOCUMENTS 2,815,747 A * 12/1957 Greenfield ............... B61L 1/20
  126/271.2 B
8,864,084 B2 * 10/2014 Honeck ..................... E01B 7/20
  238/2

(Continued)

FOREIGN PATENT DOCUMENTS

CN  2631238 Y  8/2004
CN  202416085 U  9/2012

(Continued)

OTHER PUBLICATIONS

First Office Action issued in corresponding Chinese Application No. 201380058320.6, mailed Nov. 30, 2015 (10 pages) (English Translation Obtained from USPTO Global Dossier).

*Primary Examiner* — Jason C Smith
(74) *Attorney, Agent, or Firm* — Kagan Binder, PLLC (57) ABSTRACT

A wind, snow and sand protecting device (1) for railways, comprising a base part (2a, 2b) arranged to be releasably fixed adjacent to at least one side of a track rail (3) or directly to the track rail, and a barrier holder (14), to which a barrier (15) is mountable, wherein said base part (2a, 2b) and the barrier holder (14) are interconnectable by means of a hinged joint (19) such that the barrier holder (14) is pivotable relative the base part (2a, 2b). The hinged joint (19) comprises a male connector (16) integrated with one of the base part (2a, 2b) and the barrier holder (14) and a female connector (9) integrated with the other of the base part (2a, 2b) and the barrier holder (14).

13 Claims, 4 Drawing Sheets

(56) References Cited

U.S. PATENT DOCUMENTS

| | | | | |
|---|---|---|---|---|
| 2010/0163543 A1* | 7/2010 | Reichle | .................... | H05B 3/00 219/213 |
| 2011/0253844 A1* | 10/2011 | Ferryman | ................. | E01B 7/20 246/428 |
| 2012/0261386 A1* | 10/2012 | Reichle | .................... | E01B 7/24 219/50 |
| 2016/0053440 A1* | 2/2016 | Ernstad | ................ | E01B 26/005 238/140 |

FOREIGN PATENT DOCUMENTS

| | | | |
|---|---|---|---|
| CN | 102720145 | A | 10/2012 |
| CN | 102720146 | A | 10/2012 |
| EP | 0 952 279 | A1 | 10/1999 |
| EP | 2 003 247 | A3 | 12/2008 |
| FR | 2 934 624 | A1 | 2/2010 |
| JP | H0881903 | A | 3/1996 |
| JP | 2009019367 | A | 1/2009 |
| WO | 95/34719 | A1 | 12/1995 |
| WO | 2011133501 | A2 | 10/2011 |
| WO | 2012105840 | A1 | 8/2012 |

\* cited by examiner

WIND, SNOW AND SAND PROTECTING DEVICE FOR RAILWAYS

CROSS-REFERENCE TO RELATED APPLICATIONS

This application claims priority to International Application No. PCT/EP2013/076455, filed Dec. 12, 2013, and titled "WIND, SNOW AND SAND PROTECTING DEVICE FOR RAILWAYS", which in turn claims priority from European Patent Application serial number 13163253.1, filed on Apr. 11, 2013, both of which are incorporated herein by reference in their entireties.

TECHNICAL FIELD

The present disclosure relates to a wind, snow and sand protecting device for railways, and to a method for arranging a releasable wind, snow and sand protecting device for railways on a railway track.

BACKGROUND

Electrical heating systems are used for heating up or defrost rails, including switching rails, and other components of a switch to keep them free from snow and ice. The heating system may be controlled by a temperature sensor and a precipitation gauge. One problem with this heating system is that it does not always detect weather conditions correctly. In high wind and driven snow with ensuing drifting the heating system functions poorly or its capacity is simply too low for the weather circumstances.

In order to improve the working of the heating system, tarpaulins or inclined plywood boards have been placed alongside heating points to help provide shielding and to attempt to reduce heat loss. Since the barriers are solid, they have to be placed at a distance from the rail to avoid direct contact with part of a train or rail maintenance vehicle travelling on the rails, thereby limiting their shielding function. Also, the presence of the tarpaulins and boards impede repair work on the track and whilst not fulfilling their function satisfactorily they still require inspection and maintenance. Where inspection or repair is required, removal of the tarpaulins and boards is undesirably time consuming and labor intensive.

In WO2005/1033847 the tarpaulins and plywood boards have been replaced with a wind and snow protection comprising a flexible strip arrangement for fitting along a rail in a railway track and thereby some of the disadvantages mentioned above with solid barriers are overcome. The flexible strip arrangement has a fixing part and a flexible screen projecting there from, which forms a curtain extending along the fixing part. The flexible screen of such a strip arrangement may be formed of bristles. The flexible strip arrangement is fixed adjacent to a track rail by a fixing element to a sleeper. Thereby a flexible protection is formed which prevents or at least substantially reduces the cooling effect of the wind on the rail and the formation of snow-drift up against the rail.

In WO2011/133501 another flexible protection is shown including a barrier having an upper edge with deflecting elements movable relative each other. The barrier system comprises a knuckle-hinge joint assembly with a removable pin for securing a mounting bracket holding the barrier to a base plate fixed to a sleeper. Due to this hinge joint the mounting bracket with barrier may be swung away from the rail from an operating position, where the barrier is disposed uprightly alongside the adjacent one of the track rails, to an inspection position where the barrier is spaced farther away from the adjacent one of the track rails than when the barrier is disposed in the operating position, thereby providing access to that part of the rail. Hence, removal of the barrier is not necessary for track inspection or repair.

SUMMARY

It is an object of the present disclosure to provide a wind, snow and sand protecting device for railways, which allows for easy access to the rail for track inspection, and which allows for mounting of barriers or repair or exchange of damaged or worn out barriers, with a minimum of mounting time at the rail track site. It is also an object of the present disclosure to provide a method for arranging a releasable wind, snow and sand protecting device for railways on a railway track, and to provide a wind, snow and sand protecting system for railways.

The invention is defined by the appended independent claims. Embodiments are set forth in the dependent claims, in the attached drawings and in the following description.

According to a first aspect, there is provided a wind, snow and sand protecting device for railways, the protecting device comprising a base part arranged to be releasably fixed adjacent to at least one side of a track rail or directly to the track rail, and a barrier holder, to which a barrier is mountable. The base part and the barrier holder are interconnectable by means of a hinged joint such that the barrier holder is pivotable relative the base part.

The hinged joint comprises a male connector integrated with one of the base part and the barrier holder and a female connector integrated with the other of the base part and the barrier holder.

A base part arranged to be releasably fixed adjacent to one side of a track rail may be fixed to a sleeper for example by utilizing a rail bolt used for fasten the railway track to the sleeper. The base part may also be releasably fixed directly to the track rail by fitting means clamping around the rail base (e.g. between sleepers). With such clamping fitting means a more flexible and quicker mounting/demounting of the base part to the rail is achieved, which is not dependent on the presence and position of existing fixing points, such as rail bolts. Also, in the vicinity of rail switches the number of rail bolts is low, thereby the number of such fixing points is low. Using clamping fitting means for fixing the base part to the rail track also facilitate easy adjustment of the position of the base part along the track rail through a gliding positioning movement.

The barrier which is mountable to the barrier holder may be a hard barrier of wooden board, fiber glass etc. Preferably, however, the barrier is at least partially made of flexible material. The barrier may be a flexible strip arrangement of the type described in WO2005/03384 having a fixing part and a flexible screen projecting there from, which forms a curtain extending along the fixing part. The flexible screen of such a strip arrangement may be formed of bristles. The barrier could also be a barrier as described in WO2011/133501, wherein the barrier has an upper edge comprised of a plurality of deflecting elements moveable relative to one another.

When the barrier holder with mounted barrier is interconnected with the base part and pivoted to an operating position, the barrier prevents or at least reduces the amount of snow, sand and other particles from driving along the extension of the rail tracks. When the protecting device is mounted in the vicinity of a railway switch the barrier prevents or at least reduces the amount of snow, sand and other particles that enter the switch. The protecting device may supplement an existing heating system arranged to prevent icing on a track rail.

In order for an efficient protection, several protection devices with barriers connected end to end along the extension of the track rail may be used.

When the base part is fixed adjacent to one side of a track rail or directly to the track rail, a barrier holder, with or without barrier mounted thereto, is easily interconnected to the base part through the hinged joint comprising a male connector integrated with one of the base part and the barrier holder and a female connector integrated with the other of the barrier holder and the base part. Due to this hinged joint there is no need for any special tools or external connection means for the interconnection of the two parts. The demounting of the two parts is equally simple by just opening the hinge joint. Thereby, mounting and exchanging barriers along the track rails is easy. Barrier holders with old, damaged or worn out barriers may be completely removed from the railway bed. New barriers may be pre-mounted to the barrier holder before being brought to the rail track site. Thereby, the mounting time at the rail track site is minimized, which is desirable especially for tracks heavily loaded with traffic.

The hinged joint advantageously enables the barrier holder to be pivotable relative the base part and is quickly and easily swung away from the rail to provide access to that part of the rail. Removal is hence not necessary for track inspection or repair.

The female connector may comprise a guide and a receiving member spaced from the guide.

That the guide and the receiving member may be spaced from each other means that there may be a distance between the guide and the receiving member which extends essentially in a direction parallel with the track rail when the protecting device, by means of the base part, is fixed adjacent to one side of the track rail or directly to the track rail.

The guide and/or the receiving member may for example be a key hole, a pipe provided with a slit, a sleeve etc.

The male connector may comprise a shaft.

The shaft may be shaped in such a way that it is rotatable when inserted into the guide and receiving member of the female connector. The shaft may have a cross section which is circular, rectangular, tapered etc.

The base part and/or the barrier holder may be provided with a link portion, wherein the male connector or the female connector may be linked to the base part or the barrier holder by the link portion at a distance from the base part or the barrier holder.

The link portion may extend along at least one third of a width of the base part or the barrier holder adjacent to the link portion, at least along two thirds of the width, or along the whole of the width.

The width of the base part or barrier holder may be in a direction essentially parallel to the track rail when the protecting device is mounted to the track rail or adjacent to the track rail.

The shaft may be arranged on the link in such a way that the shaft is protruding on both sides of the link in a direction essentially parallel with the extension of the track rail when the protecting device by means of the base part is fixed adjacent to one side of the track rail or directly to the track rail.

The link portion may be arranged to fit within the space between the receiving member and the guide.

The shaft may be arranged to be insertable into/removable from the guide and the receiving member, when the barrier holder is in a first position relative the base part.

When the barrier holder is in a second position relative the base part, the shaft may be prevented from being removed from the receiving member and the guide.

The second position may be a position different from the first position. The second position may be reached by angular rotation of the barrier holder relative the base part.

The barrier holder may comprise a clamp for releasably holding the barrier.

The clamp may for this purpose be provided with for example a screw, latch, sprint, strap or the like. Thereby mounting/dismounting or exchange of barriers to the barrier holder is fast and simple. A barrier mounted to the barrier holder may be removed or exchanged without having to disconnect the barrier holder from the base part, which could be advantageous for some applications.

Alternatively, the barrier need not be releasably held by said barrier holder but may be permanently fixed to the barrier holder by means of for example glue, rivets, nails, etc.

The protecting device may further comprise locking means that releasably lock the base part and the barrier holder together when the barrier holder is in the second position relative the base part.

Locking means may prevent relative rotation between the base part and the barrier holder and holds a barrier mounted to the barrier holder in a second operating position. The locking means may be a latch.

According to a second aspect there is provided a method for arranging a releasable wind, snow and sand protecting device for railways on a railway track, said method comprising the steps of:
  providing a base part integrated with one of a male connector and a female connector;
  providing a barrier holder, to which a barrier is mountable, said barrier holder being integrated with the other one of said male connector and said female connector;
  fixing the base part to at least one side of a track rail or directly to the track rail;
  bringing the barrier holder into a first position relative the base part, for hinged interconnection with the base part wherein said hinged interconnection is enabled by a hinged joint between said male connector and said female connector;
  pivoting the barrier holder to a second position relative the base part wherein disconnection of the base part and the barrier holder is prevented.

The method may further comprise a step of releasably locking the base part and the barrier holder together when the barrier holder is in the second position relative the base part.

DESCRIPTION OF EMBODIMENTS

Figure 1:
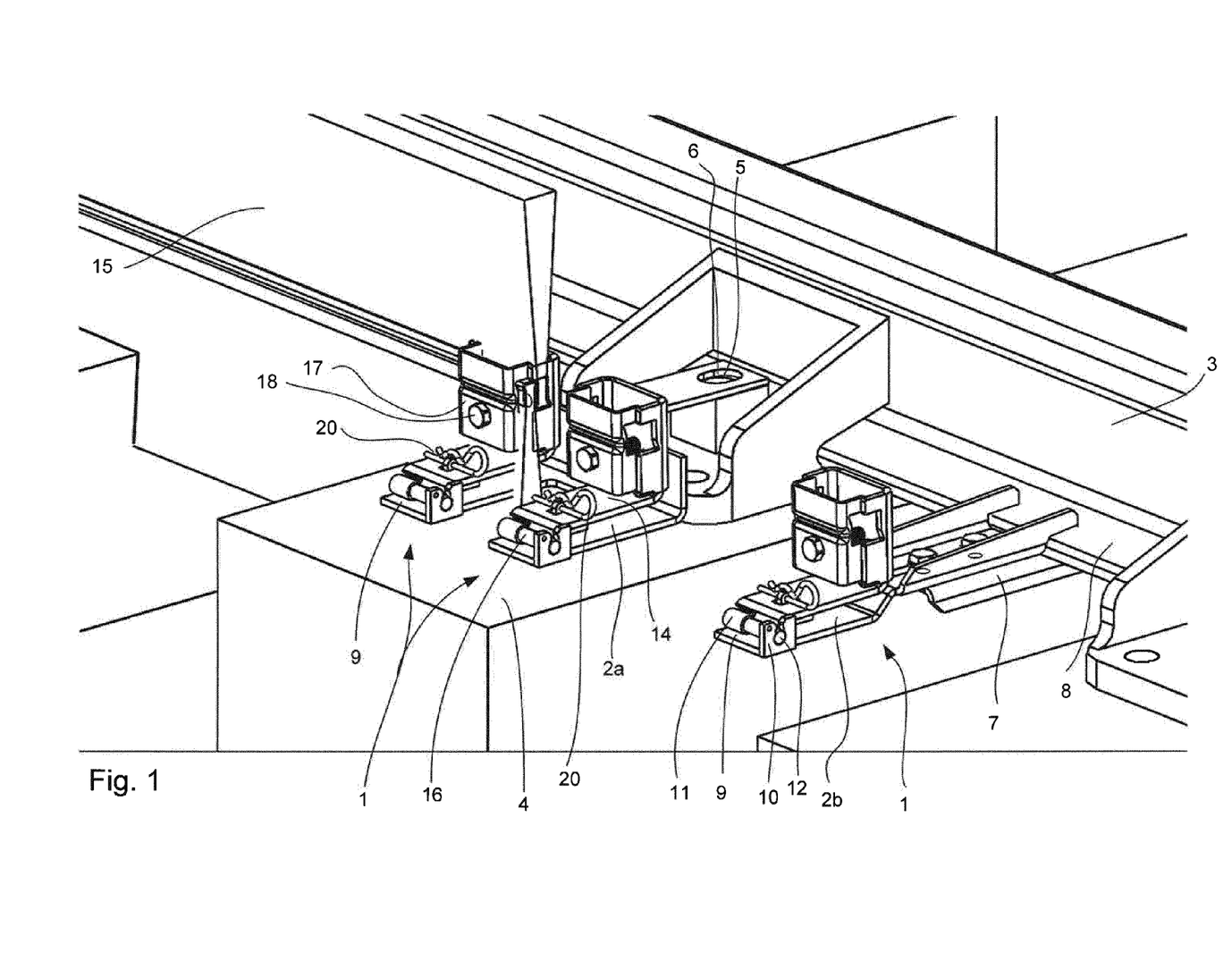
FIG. 1 is a schematic perspective view showing different embodiments of a wind, snow and sand protecting device.
Figure 2:
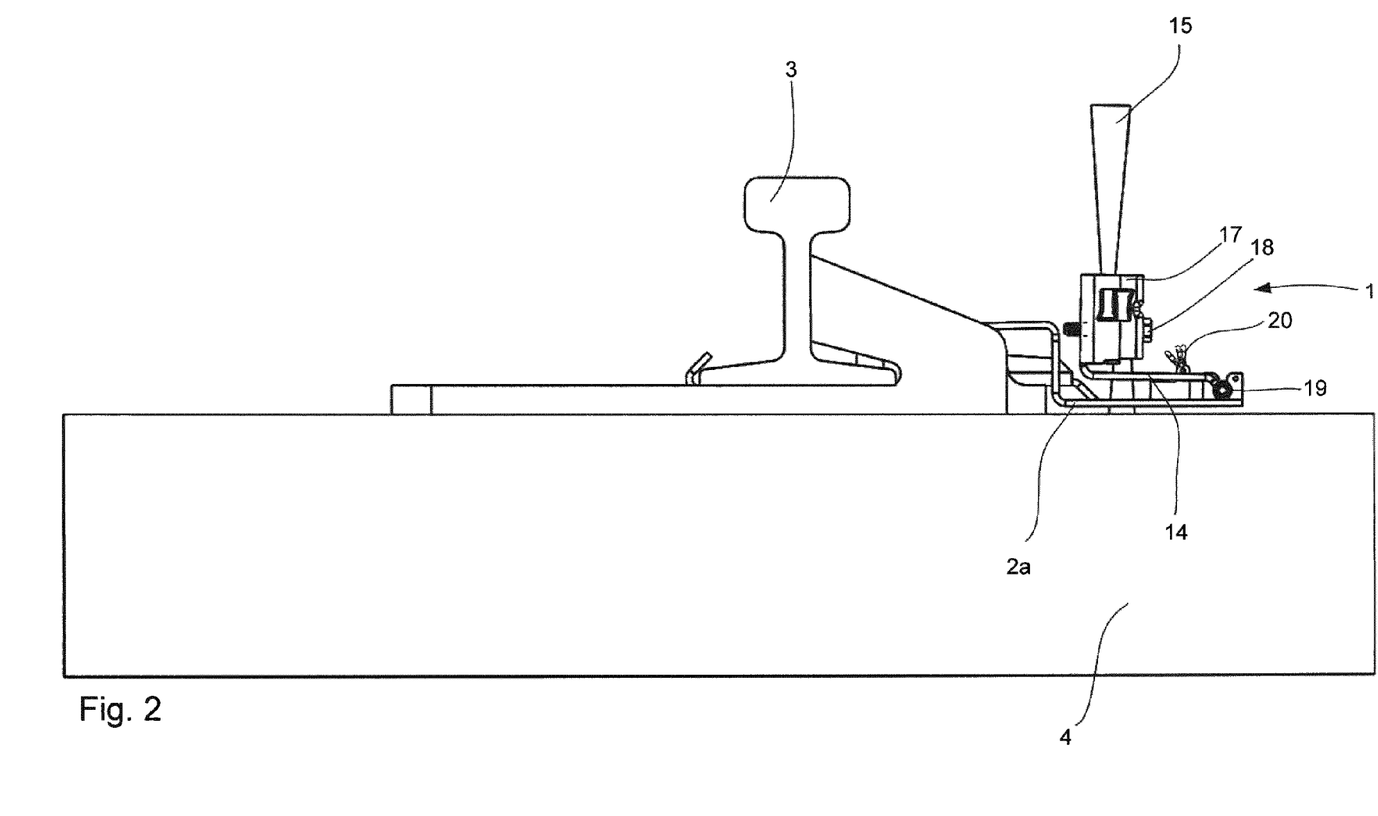
FIG. 2 is a schematic sectional side view of an embodiment of a protecting device.
Figure 3:
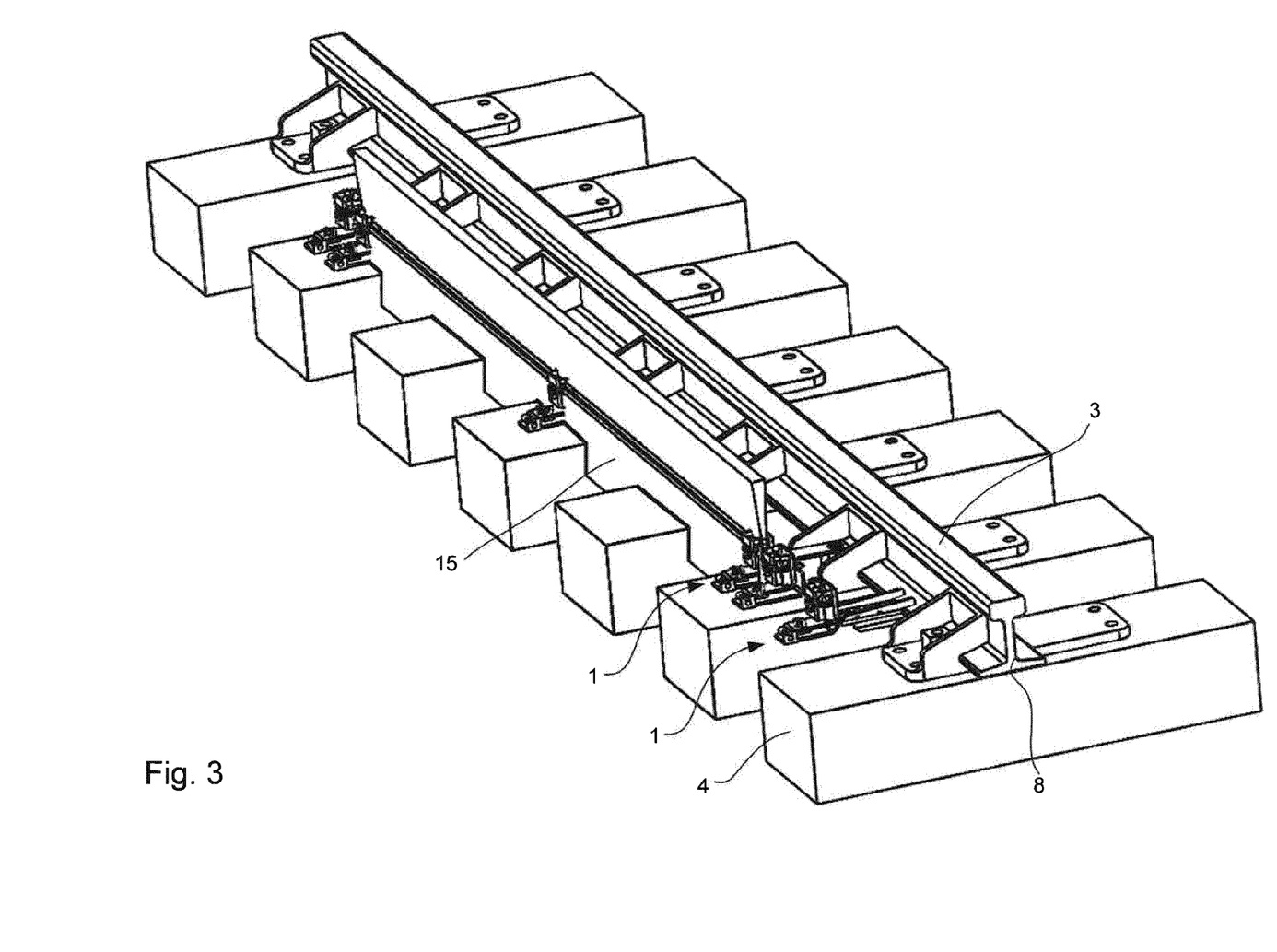
FIG. 3 is a schematic perspective view of different embodiments of the protecting device.

A wind, snow and sand protecting device 1 for railways is shown in FIGS. 1, 2 and 3. The protecting device 1 has a base part 2a, 2b which may be releasably fixed adjacent to the side of a track rail 3 or directly to the track rail 3, as shown in FIG. 1.

The base part 2a may be fixed to a sleeper 4 for example by utilizing a rail bolt 5, used for fasten the railway track 3 to the sleeper 4, as a fixing point. Such a base part 2a is in an end portion provided with a through hole 6, the diameter of which matches the diameter of the rail bolt 5 for a secure fastening of the base part 2a to the sleeper 4.

In another variant of the base part, the base part 2b may in one end be provided with fitting means 7 with a clamp for clamping around the rail base 8 (e.g. between sleepers 4), thereby fixing directly to the track rail 3. The position of the fitting means 7 is easily adjustable along the rail base 8 through a gliding movement before the base part 2b is fixed in its final position.

The two variants of the base part 2a, 2b may be used alone or be alternately used along the track rail 3.

Figure 4:
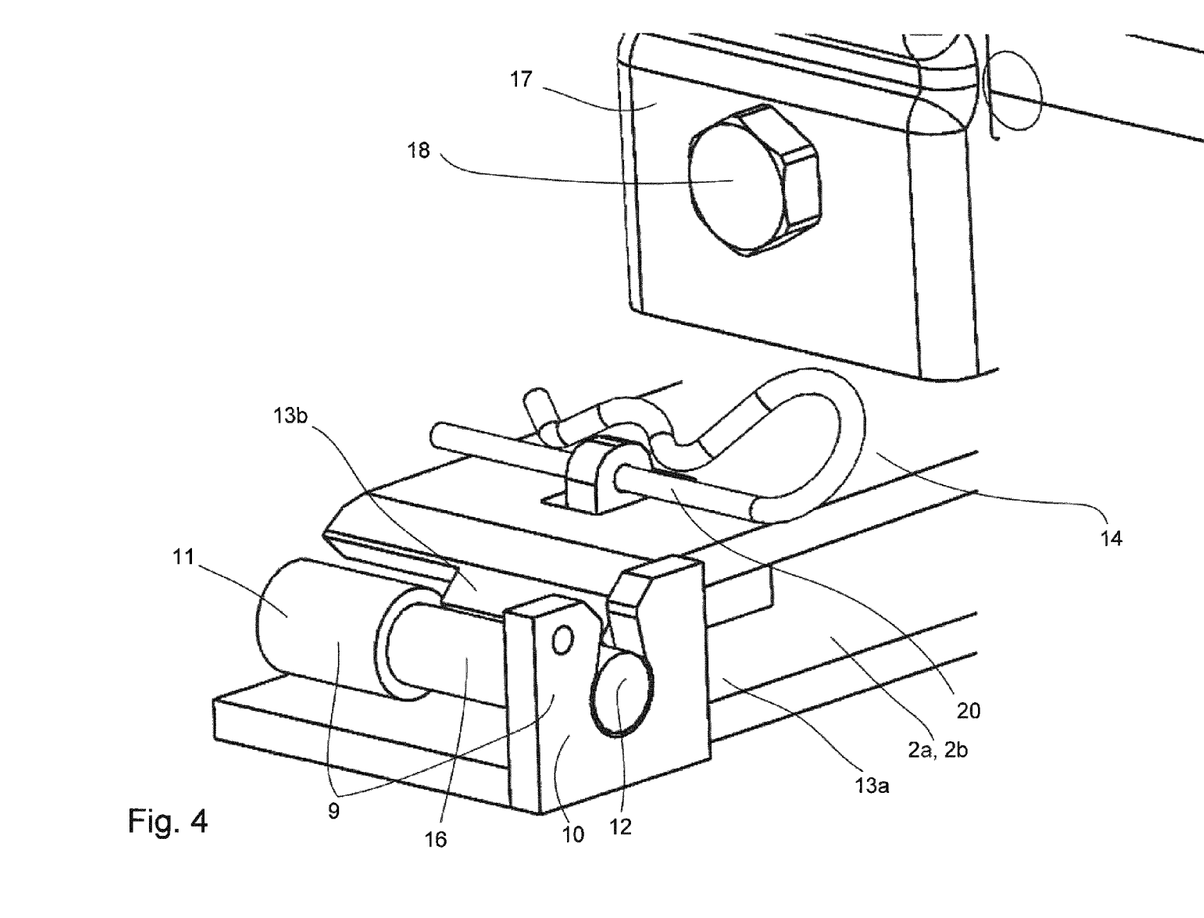
FIG. 4 is a schematic perspective view of an embodiment of a detail of the protecting device.

The base part 2a, 2b is in the embodiment shown in FIG. 1-FIG. 4 provided with a female connector 9 integrated with the base part 2a, 2b. In other embodiments a male connector could be integrated with the base part 2a, 2b. The female connector 9 in FIG. 4 comprises a guide 10 and a receiving member 11 spaced from the guide 10, such that there is a distance between the guide 10 and the receiving member 11 which extends essentially in a direction parallel with the track rail 3 when the base part 2a, 2b is fixed adjacent to the side of the track rail 3 or directly to the track rail 3. The guide 10 is in FIG. 4 provided with a key hole 12. The guide 10 could also for example be a sleeve or pipe provided with a slit. The receiving member 11 is in FIG. 4 shown as a sleeve. The guide could also be a key hole or a sleeve or pipe provided with a slit.

The base part 2a, 2b is provided with a link portion 13a, to which the female connector 9 is linked at a distance from the base part 2a, 2b. The link portion 13a may extend along at least one third of a width of the base part 2a, 2b adjacent to the link portion 13a, at least along two thirds of the width, or along the whole of the width. The width of the base part 2a, 2b is in a direction essentially parallel to the track rail 3 when the base part 2a, 2b is mounted to the track rail 3 or adjacent to the track rail 3.

The link portion 13a may extend in a direction which is non-parallel to a principal plane of the base part 2a, 2b and may be angled 5-90° relative the principal plane of the base part 2a, 2b. Thereby, the female connector 9 is offset from the principal plane, which may facilitate that the base part 2a, 2b and the barrier holder 14 become parallel when interconnected.

The base part 2a, 2b may be made of metallic material, such as galvanized steel or stainless steel.

The base part 2a, 2b with the link portion 13a and the female connector 9 may be manufactured as one piece through for example casting. In another embodiment the link portion 13a and/or female connector 9 are manufactured as separate parts which are joined together by means of for example welding.

The protecting device 1 also comprises a barrier holder 14 to which a barrier 15 is mountable. The barrier holder 14 is in the embodiment shown in FIG. 1-FIG. 4 provided with a male connector 16 integrated with the barrier holder 14. In other embodiments a female connector could be integrated with the barrier holder 14. In the figures the male connector 1 is a shaft. The shaft 16 may have a cross section which is circular, rectangular, cone shaped etc. The shaft 16 is shaped in such a way that it is rotatable when inserted into the guide 10 and receiving member 11 of the female connector 9. The barrier holder is in the embodiments of the figures provided with a link portion 13b, and the shaft 16 is linked to the barrier holder 14 by the link portion 13b at a distance from the barrier holder 14. The link portion 13b here extends along at least one third of a width of the barrier holder adjacent to the link portion. In other embodiments it extends along at least two thirds of the width, or along the whole of the width of the barrier holder 14 adjacent to the link portion 13b. The width of the barrier holder 14 is in a direction essentially parallel to the track rail 3 when the protecting device 1 is mounted to the track rail 1 or adjacent to the track rail 1.

The link portion 13b may extend in a direction which is non-parallel to a principal plane of the base part 2a, 2b and may be angled 5-90° relative the principal plane of the base part 2a, 2b. Thereby, the male connector 16 is offset from the principal plane, which may facilitate that the base part 2a, 2b and the barrier holder 14 become parallel when interconnected.

The shaft 16 may be arranged on the link 13b in such a way that the shaft 16 is protruding on both sides of the link 13b in a direction essentially parallel with the extension of the track rail 3 when the protecting device 1 is fixed adjacent to one side of the track rail 1 or directly to the track rail 1.

The link 13b of the barrier holder 14 is here arranged to fit within the space between the receiving member 11 and the guide 10 of the base part.

The barrier holder 14 may be made of metallic material, such as galvanized steel or stainless steel.

The barrier holder 14 with the link portion 13b and the male connector 16 may be manufactured as one piece through for example casting. In another embodiment the link portion 13b and/or male connector 16 are manufactured as separate parts which are joined together by means of for example welding.

The barrier 15 which is mountable to the barrier holder 14 may be a hard barrier of wooden board, fiber glass etc. Preferably, however, the barrier is at least partially made of flexible material. The barrier may be a flexible strip arrangement of the type described in WO2005/03384 having a fixing part and a flexible screen projecting there from, which forms a curtain extending along the fixing part. The flexible screen of such a strip arrangement may be formed of bristles. The technical effect of that the screens are formed of bristles is that some wind may blow through the bristles which will cause a turbulence. The laminar flow of the wind blowing above/below the screens generates a lower pressure than the turbulent flow through the bristles. Thereby, an overpressure is generated behind the bristle screens which will help keeping any snow or sand from staying in the area proximate to the wind, snow and sand protecting device 1.

The barrier could also be a barrier as described in WO2011/133501, wherein the barrier has an upper edge comprised of a plurality of deflecting elements moveable relative to one another.

The barrier holder 14 shown in the figures comprises a clamp 17 for releasably holding the barrier 17. In other embodiments the barrier 15 is not releasably held by the barrier holder 14 but is permanently held by the barrier holder 14 by means of for example glue, rivets, nails, etc. The clamp 17 of the barrier holder 14 is here releasable and adjustable by means of a screw 18. Other possible means for such clamping is a latch, sprint, strap or the like.

When the base part 2a, 2b is fixed adjacent to one side of a track rail 3 or directly to the track rail 3, a barrier holder 14, with or without barrier 15 mounted thereto, is easily interconnected to the base part 2a, 2b through a hinged joint 19 comprising the male connector 16 integrated with the barrier holder 14 and a female connector 9 integrated with the base part 2a, 2b. The hinged joint 19 is such that the barrier holder 14 is pivotable relative the base part 2a, 2b. When the barrier holder 14 is in a first position relative the base part 2a, 2b, the shaft 16 is arranged to be insertable into/removable from the guide 12 and the receiving member 12. When the barrier holder 14 is brought to a second position relative the base part 2a, 2b, the shaft 16 is prevented from being removed from the receiving member 12 and the guide 11. The second position is a position different from the first position and is reached by angular rotation of the barrier holder 14 relative the base part 2a, 2b.

Due to this hinged joint 19 there is no need for any special tools or external connection means for the interconnection of the two parts 2a, 2b, 14. The demounting of the two parts 2a, 2b, 14 is equally simple by just opening the hinge joint 19.

When the barrier holder 14 is interconnected with the base part 2a, 2b and pivoted to an operating position, the barrier 17 mounted to the barrier holder 14 prevents or at least reduces the amount of snow, sand and other particles from driving along the extension of the rail tracks 3. When the protecting device 1 is mounted in the vicinity of a railway switch the barrier 15 prevents or at least reduces the amount of snow, sand and other particles that enters the switch. The protecting device 1 may supplement an existing heating system arranged to prevent icing on a track rail 3.

In order for an efficient protection several protection devices 1 may be needed with barriers 15 connected end to end along the extension of the track rail 3. One barrier 15 may be connected to another barrier 15 by connection means, in such a way that a continuous barrier 15 is formed along one side of the track rail 3. One, two or more barrier holders 14 may be required to hold one barrier 15, FIG. 3.

The hinged joint 19 between the base part 2a, 2b and the holding part 14 facilitates mounting and exchange of barriers 15 along the track rails 3. Barrier holders 14 with old, damaged or worn out barriers 15 may be completely removed from the railway bed. New barriers 15 may be pre-mounted to the barrier holder 14 before being brought to the rail track site. Thereby, the mounting times at the rail track site is minimized, which is desirable for tracks heavily loaded with traffic.

The hinged joint 19 advantageously enables the barrier holder 14 to be pivotable relative the base part 2a, 2b and is quickly and easily swung away from the rail to provide access to that part of the rail. Removal is hence not necessary for track inspection or repair.

A seen for example in FIG. 1 and FIG. 4, the protecting device 1 may further comprise locking means 20 that releasably locks the base part 2a, 2b and the barrier holder 14 together when the barrier holder 14 is in the second position relative the base part 2a, 2b. The locking means 20 prevents relative rotation between the base part 2a, 2b and the barrier holder 14 and holds a barrier 15 mounted to the barrier holder 14 in a second operating position, where the barrier prevents or at least reduces the amount of snow, sand and other particles from driving along the extension of the rail tracks.

The locking means 20 may for example be a latch.

The invention claimed is:

1. Wind, snow and sand protecting device (1) for railways, said protecting device (1) comprising:
 a base part (2a, 2b) arranged to be releasably fixed adjacent to at least one side of a track rail (3) or directly to said track rail (3);
 a barrier holder (14), to which a barrier (15) is mountable;
 wherein said base part (2a, 2b) and said barrier holder (14) are interconnectable by means of a hinged joint (19) such that said barrier holder (14) is pivotable relative said base part (2a, 2b);
 characterized in that
 said hinged joint (19) comprises a male connector (16) integrated with one of said base part (2a, 2b) and said barrier holder (14) and a female connector (9) integrated with the other of said base part (2a, 2b) and said barrier holder (14).

2. The protecting device (1) according to claim 1, wherein said female connector (9) comprises a guide (10) and a receiving member (11) spaced from said guide (10).

3. The protecting device (1) according to claim 1, wherein said male connector (16) comprises a shaft.

4. The protecting device (1) according to claims 2, wherein said shaft (16) is arranged to be insertable into/removable from said guide (10) and said receiving member (11), when said barrier holder (14) is in a first position relative said base part (2a, 2b).

5. The protecting device (1) according to claims 4, wherein when said barrier holder (14) is in a second position relative said base part (2a, 2b), said shaft (16) is prevented from being removed from said receiving member (1 1) and said guide (10).

6. The protecting device (1) according to claim 1, wherein said base part (2a, 2b) and/or said barrier holder (14) is provided with a link portion (13a, 13b), wherein said male connector (16) or said female connector (9) are linked to said base part (2a, 2b) or said barrier holder (14) by said link portion at a distance from said base part (2a, 2b) or said barrier holder (14).

7. The protecting device (1) according to claim 6, wherein said link portion (13a, 13b) extends along at least one third of a width of said base part (2a, 2b) or said barrier holder (14) adjacent to said link portion (13a, 13b), at least along two thirds of said width, or along the whole of said width.

8. The protecting device (1) according to claim 6, wherein said male connector (16) comprises a shaft and said shaft (16) is arranged on said link portion (13a, 13b) in such a way that said shaft (16) is protruding on both sides of said link portion (13a, 13b) in a direction essentially parallel with the extension of said track rail (3) when said protecting device (1) by means of said base part (2a, 2b) is fixed adjacent to one side of said track rail (3) or directly to said track rail (3).

9. The protecting device (1) according to claim 2, wherein said link portion (13a, 13b) is arranged to fit within said space between said receiving member (11) and said guide (10).

10. The protecting device (1) according to claim 1, wherein said barrier holder (14) comprises a clamp (17) for releasably holding said barrier (15).

11. The protecting device (1) according to claim 5, further comprising locking means (20) that releasably locks said base part (2a, 2b) and said barrier holder (14) together when said barrier holder (14) is in said second position relative said base part (2a, 2b).

12. Method for arranging a releasable wind, snow and sand protecting device (1) for railways on a railway track, said method comprising the steps of:
 providing a base part (2a, 2b) integrated with one of a male connector (16) and a female connector (9);
 providing a barrier holder (14), to which a barrier (15) is mountable, said barrier holder (14) being integrated with the other one of said male connector (16) and said female connector (9);

fixing said base part (2a, 2b) to at least one side of a track rail (3) or directly to said track rail (3);

bringing said barrier holder (14) into a first position relative said base part (2a, 2b), for hinged interconnection with said base part (2a, 2b) wherein said hinged interconnection is enabled by a hinged joint (19) between said male connector (16) and said female connector (9);

pivoting said barrier holder (14) to a second position relative said base part (2a, 2b) wherein disconnection of said base part (2a, 2b) and said barrier holder (14) is prevented.

13. The method according to claim 11, further comprising a step of releasably locking said base part (2a, 2b) and said barrier holder (14) together when said barrier holder (14) is in said second position relative said base part (2a, 2b).

* * * * *